United States Patent
Brooks et al.

[11] Patent Number: 6,142,576
[45] Date of Patent: Nov. 7, 2000

[54] ASSEMBLY FOR COUPLING A DUMP TRUCK BED TO A FRAME OF A WORK MACHINE

[75] Inventors: Tom Brooks, Oakley; Jason Martin, Decatur; Robert L. McNabb, Monticello, all of Ill.

[73] Assignee: Caterpillar Inc., Peoria, Ill.

[21] Appl. No.: 09/204,850

[22] Filed: Dec. 3, 1998

Related U.S. Application Data

[60] Provisional application No. 60/102,195, Sep. 28, 1998.

[51] Int. Cl.[7] .................. B60P 1/04; B60P 1/28; B61D 9/00; B65G 67/32
[52] U.S. Cl. ............................ 298/22 P; 298/22 R
[58] Field of Search ................. 298/22 R, 22 P, 298/22 A; 384/206, 208, 211, 212

[56] References Cited

U.S. PATENT DOCUMENTS

| | | |
|---|---|---|
| 1,358,675 | 11/1920 | Schmitt . |
| 1,534,439 | 4/1925 | Burkhardt et al. . |
| 1,595,981 | 8/1926 | Ballert . |
| 1,611,012 | 12/1926 | Flowers . |
| 1,717,485 | 6/1929 | Wirz . |
| 1,819,411 | 8/1931 | Flowers . |
| 1,978,043 | 10/1934 | Galanot . |
| 2,607,641 | 8/1952 | Messinger .......................... 348/622 |
| 2,752,193 | 6/1956 | Kling ................................... 298/22 P |
| 3,712,676 | 1/1973 | Benninger et al. ............... 298/22 R |
| 3,720,446 | 3/1973 | Kelley . |
| 4,116,486 | 9/1978 | Duttarer . |
| 4,227,826 | 10/1980 | Conrad ............................. 384/206 X |
| 4,531,781 | 7/1985 | Hunt et al. . |
| 5,775,815 | 7/1998 | Abusamra ......................... 384/208 |

FOREIGN PATENT DOCUMENTS

| | | |
|---|---|---|
| 151286 | 8/1955 | Germany . |
| 459776 | 9/1968 | Switzerland . |
| 1169854 | 7/1985 | U.S.S.R. . |
| 1555-154A | 4/1990 | U.S.S.R. . |

Primary Examiner—Joseph D. Pape
Assistant Examiner—Scott Carpenter
Attorney, Agent, or Firm—Maginot, Addison & Moore

[57] ABSTRACT

An assembly for coupling a dump truck bed to a frame of a work machine includes an attachment member secured in fixed relation to the frame. The attachment member has a plurality of first fastener apertures defined therein. The assembly also includes a hydraulic cylinder having a first end and a second end. The first end of the hydraulic cylinder is pivotally coupled to the dump truck bed. The assembly further includes a bearing assembly having an inner race and an outer race, wherein (i) the outer race is disposed around the inner race such that the outer race rotates in relation to the inner race thereby defining a central axis of rotation, (ii) the outer race is fixed in relation to the second end of the hydraulic cylinder, (iii) the inner race is fixed in relation to the attachment member, and (iv) the inner race has a plurality of second fastener apertures defined therein. The assembly also includes a plurality bolts respectively positioned within the plurality of first apertures of the attachment member and the plurality of second apertures of the inner race so as to secure the inner race to the attachment member, wherein the plurality of first apertures of the attachment member and the plurality of second apertures of the inner race are each eccentrically located relative to the central axis of rotation.

15 Claims, 4 Drawing Sheets

ASSEMBLY FOR COUPLING A DUMP TRUCK BED TO A FRAME OF A WORK MACHINE

This application claims the benefit of U.S. Provisional Application Serial No. 60/102,195, filed Sep. 28, 1998.

TECHNICAL FIELD OF THE INVENTION

The present invention relates generally to a work machine, such as a dump truck, and more particularly to an assembly for coupling a dump truck bed to a frame of a work machine.

BACKGROUND OF THE INVENTION

Work machines, such as dump trucks, generally include a bed pivotally attached to a frame of the dump truck. A hydraulic cylinder, typically referred to as a hoist cylinder, has one end thereof secured to the bed and the other end thereof secured to the frame. Extension of the hoist cylinder locates the bed in a dumping position relative to the frame, i.e. the bed is tilted relative to the ground such that material located in the bed will slide out under the force of gravity. Alternatively, retraction of the hoist cylinder locates the bed in a loading position relative to the frame, i.e. the bed is in a substantially parallel relationship with the ground such that material can be loaded into the bed.

Generally, the bed is moved between the aforementioned dumping position and loading position numerous times during the performance of work functions. Therefore, a significant amount of force is communicated to the securment mechanism utilized to attach the hoist cylinder to the frame of the dump truck. This force causes the securement mechanism to mechanically fail in a relatively short period of time which adds to the maintenance cost of the dump truck.

What is needed therefore is an assembly for coupling a dump truck bed to a frame of a work machine which overcomes the above-mentioned drawback.

DISCLOSURE OF THE INVENTION

In accordance with a first embodiment of the present invention, there is provided an assembly for coupling a dump truck bed to a frame of a work machine. The assembly includes an attachment member secured in fixed relation to the frame. The attachment member has a first fastener aperture defined therein. The assembly also includes a cylinder having a first end and a second end. The first end of the cylinder is pivotally coupled to the dump truck bed. The assembly further includes a bearing assembly having an inner race and an outer race, wherein (i) the outer race is disposed around the inner race such that the outer race rotates in relation to the inner race thereby defining a central axis of rotation, (ii) the outer race is fixed in relation to the second end of the cylinder, (iii) the inner race is fixed in relation to the attachment member, and (iv) the inner race has a second fastener aperture defined therein. The assembly also includes a fastener positioned within the first aperture of the attachment member and the second aperture of the inner race so as to secure the inner race to the attachment member, wherein the first aperture of the attachment member and the second aperture of the inner race are each eccentrically located relative to the central axis of rotation.

In accordance with a second embodiment of the present invention, there is provided an assembly for coupling a dump truck bed to a frame of a work machine. The assembly includes an attachment member secured in fixed relation to the frame. The attachment member has a plurality of first fastener apertures defined therein. The assembly also includes a hydraulic cylinder having a first end and a second end. The first end of the hydraulic cylinder is pivotally coupled to the dump truck bed. The assembly further includes a bearing assembly having an inner race and an outer race, wherein (i) the outer race is disposed around the inner race such that the outer race rotates in relation to the inner race thereby defining a central axis of rotation, (ii) the outer race is fixed in relation to the second end of the hydraulic cylinder, (iii) the inner race is fixed in relation to the attachment member, and (iv) the inner race has a plurality of second fastener apertures defined therein. The assembly also includes a plurality of bolts respectively positioned within the plurality of first apertures of the attachment member and the plurality of second apertures of the inner race so as to secure the inner race to the attachment members, wherein the plurality of first apertures of the attachment member and the plurality of second apertures of the inner race are each eccentrically located relative to the central axis of rotation.

BEST MODE FOR CARRYING OUT THE INVENTION

Figure 1:
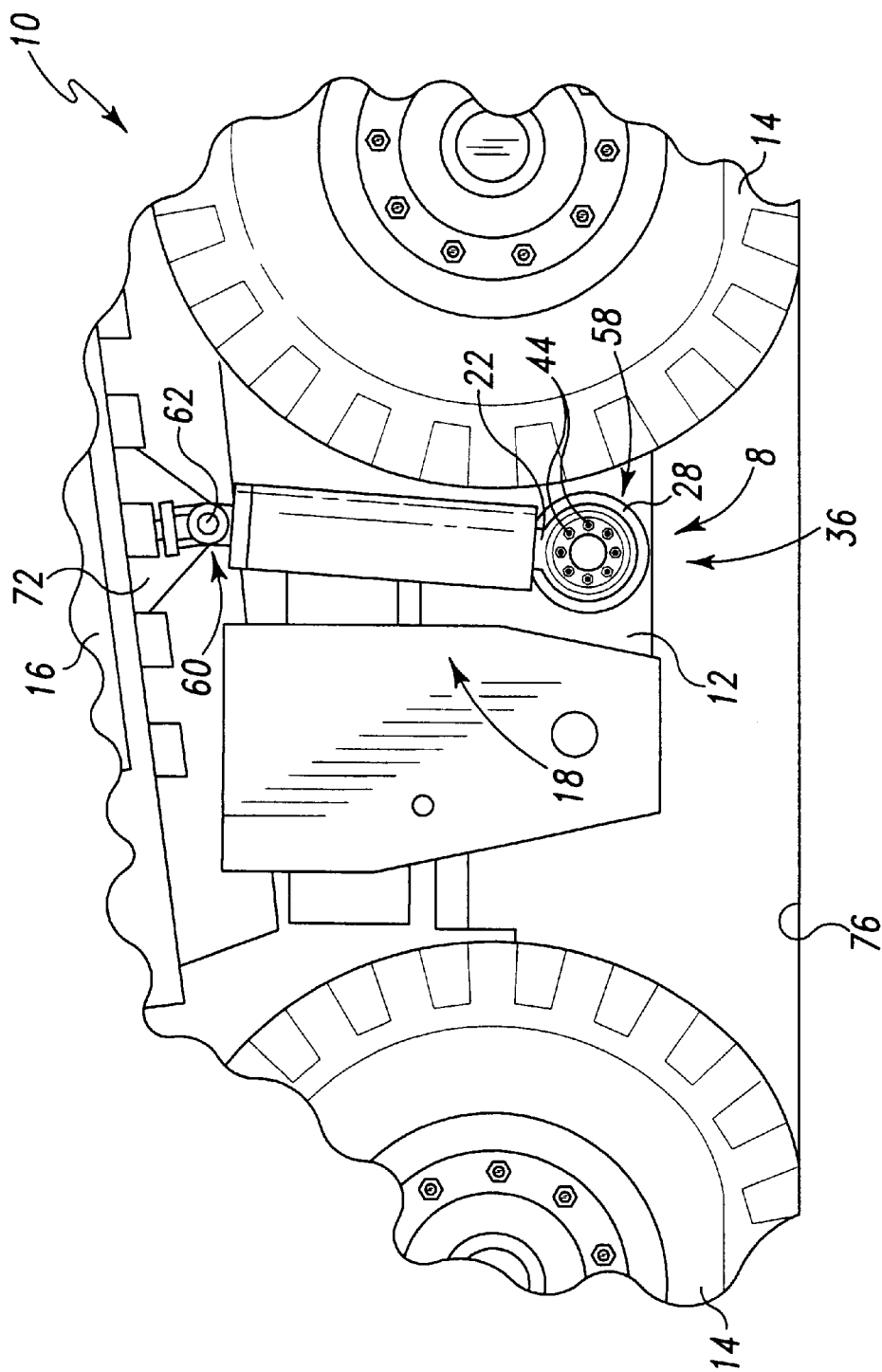
FIG. 1 is a fragmentary side elevational view of a work machine having an assembly for coupling a dump truck bed to a frame of the work machine which incorporates the features of the present invention therein (note that the bed is shown in the loading position)

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a portion of a work machine 10, such as a dump truck, which incorporates the features of the present invention therein. Work machine 10 includes a frame 12, a number of tires 14 secured to frame 12, and a bed 16 pivotally attached to frame 12 such that bed 16 is positionable between a loading position and a dumping position (see FIG. 2). Work machine 10 also includes an assembly 8 attached thereto for coupling bed 16 to frame 12.

Figure 3:
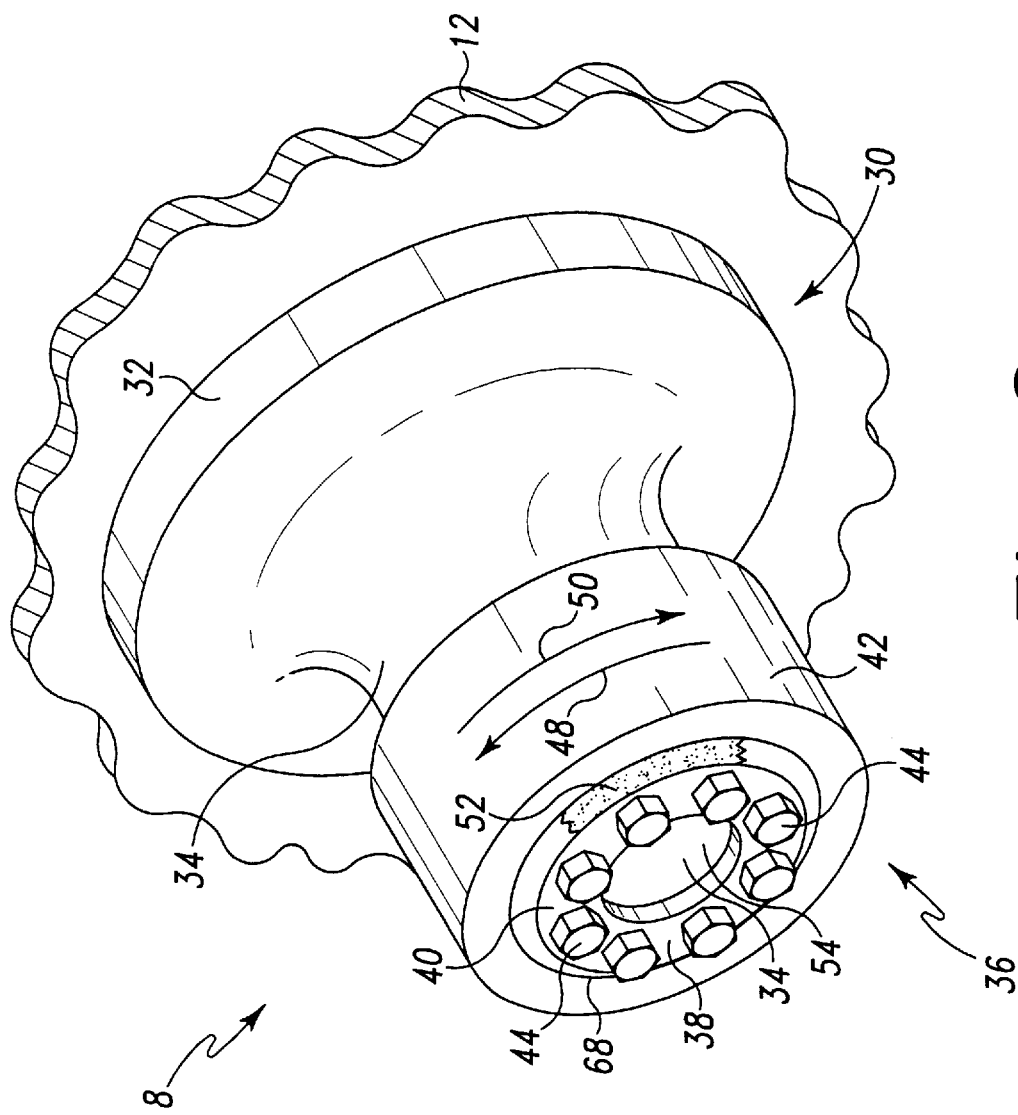
FIG. 3 is a fragmentary perspective view of the attachment assembly of FIG. 1, with the hydraulic cylinder removed for clarity of description.
Figure 4:
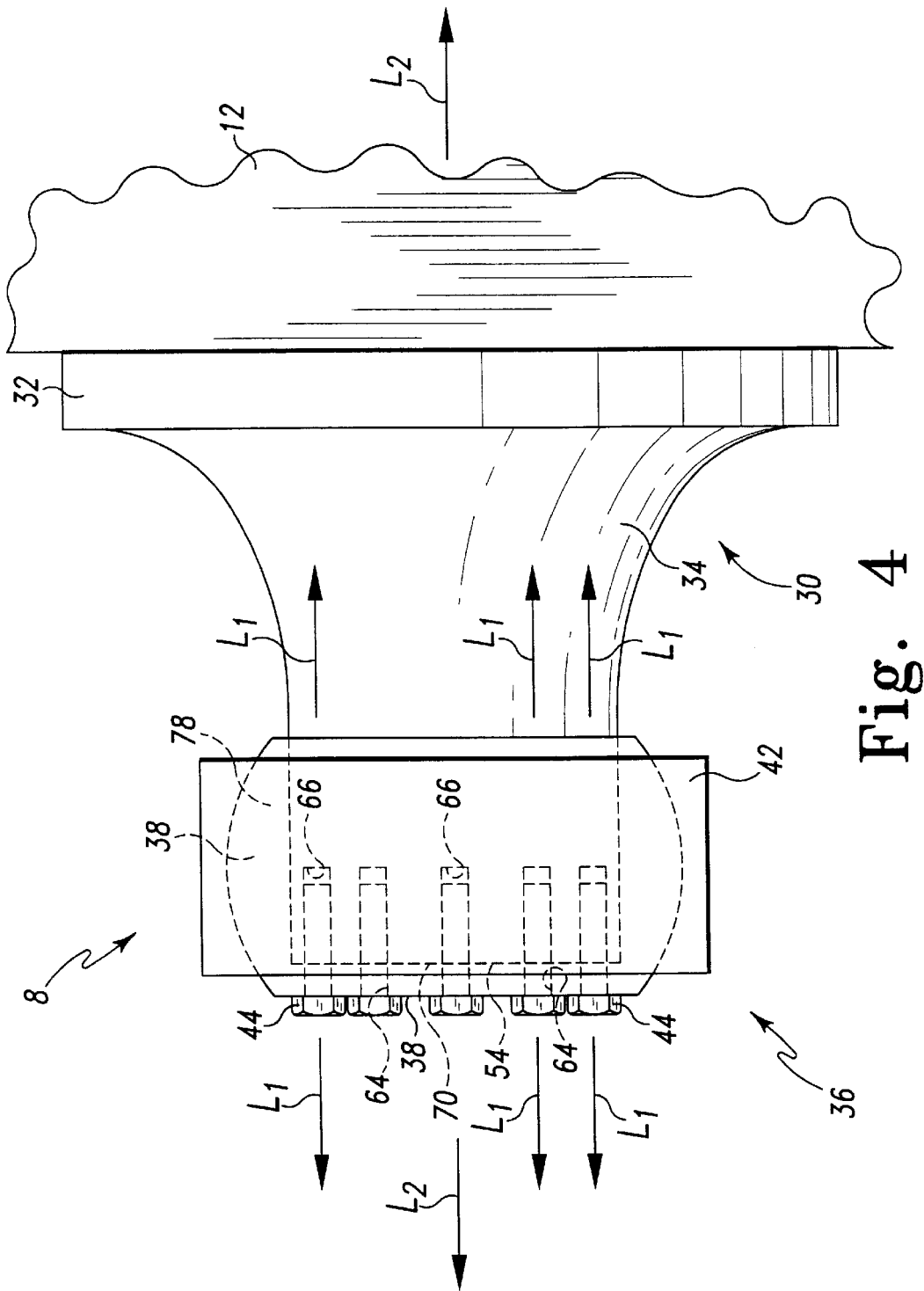
FIG. 4 is a fragmentary side elevational view of the attachment assembly of FIG. 1, with a portion of the inner race, the neck portion, and the bolts shown in phantom for clarity of description.

Assembly 8 includes a hydraulic cylinder 18 having a first end 60 and a second end 58. Assembly 8 also includes an attachment member 30 (see FIGS. 3 and 4), a bearing assembly 36, and a number of fasteners 44, such as bolts. Hydraulic cylinder 18 includes an annular adapter 28, a rod 22, and a bracket 62, As shown in FIGS. 3 and 4, bearing assembly 36 includes an inner race 38 and an outer race 42. Inner race 38 includes (i) a fastener portion 40 having a number of apertures 64 (see FIG. 3) defined therein and (ii) a bearing portion 78. Outer race 42 is disposed around inner race 38. In addition, a lubricant 52 is interposed between inner race 38 and outer race 42 such that outer race 42 can rotate relative to inner race 38 in the directions indicated by arrows 48 and 50 (see FIG. 3). However, it should be understood that inner race 38 and outer race 42 are configured such that outer race 42 can not inadvertently slide off of, or be removed from, inner race 38.

Attachment member 30 includes a base 32 and a neck portion 34 extending from base 32 such that neck portion 34 is horizontally oriented. Neck portion 34 has a face 54 defined thereon such that face 54 is vertically oriented. Face 54 has a number of threaded receptacles 66 defined therein (see FIG. 4). Base 32 is welded to frame 12 such that neck portion 34 extends outwardly from frame 12.

As more clearly shown in FIG. 3, bearing assembly 36 is positioned relative to neck portion 34 such that (i) inner race 38 and outer race 42 are disposed around neck portion 34 and (ii) fastener portion 40 extends partially over face 54. In addition, bearing assembly 36 is positioned relative to neck portion 34 such that apertures 64 are respectively aligned with threaded receptacles 66 so as to define a plurality of lines $L_1$. Fasteners 44 are inserted through apertures 64 and into threaded receptacles 66 such that fasteners 44 meshingly engage threaded receptacles 66 thereby securing bearing assembly 36 to neck portion 34.

It should be understood that fasteners 44 are inserted through apertures 64 and threaded receptacles 66 such that inner race 38 is unable to rotate relative to neck portion 34 once fasteners 44 are meshingly engaged with threaded receptacles 66. Specifically, threaded receptacles 66, complementary apertures 64, and fasteners 44 are eccentrically located relative to a central axis of rotation $L_2$ (see FIG. 4) of bearing assembly 36. Having threaded receptacles 66, complementary apertures 64, and fasteners 44 eccentrically located relative to central axis of rotation $L_2$ in the above described manner ensures that inner race 38 is unable to rotate relative to neck portion 34 when fasteners 44 are meshingly engaged with threaded receptacles 66. However, it should be understood that utilizing a different number of fasteners 44, apertures 64, and threaded receptacles 66 arranged in alternative configurations is contemplated as long as the alternative configuration eccentrically locates threaded receptacles 66, complementary apertures 64, and fasteners 44 relative to central axis of rotation $L_2$ and therefore prevents the rotation of inner race 38 relative to neck portion 34. For example, a single fastener 44 could be used as long as the fastener 44, aperture 64, and threaded receptacle 66 are positioned eccentrically relative to central axis of rotation $L_2$ such that inner race 38 is unable to rotate relative to neck portion 34.

As shown in FIG. 1, hydraulic cylinder 18 is positioned relative to bearing assembly 36 such that adapter 28 is disposed around outer race 42. Specifically, adapter 28 is press fit around outer race 42 such that adapter 28 is unable to rotate relative to outer race 42. However, it should be appreciated that outer race 42 and adapter 28 can rotate relative to inner race 38. Furthermore, hydraulic cylinder 18 is positioned such that bracket 62 is located adjacent to a flange 72 extending from bed 16. Bracket 62 is then secured to flange 72 with a pin (not shown). Attaching hydraulic cylinder 18 in the above described manner attaches (i) first end 60 of hydraulic cylinder 18 to bed 16 and (ii) second end 58 of hydraulic cylinder 18 to outer race 42 of bearing assembly 36.

INDUSTRIAL APPLICABILITY

Figure 2:
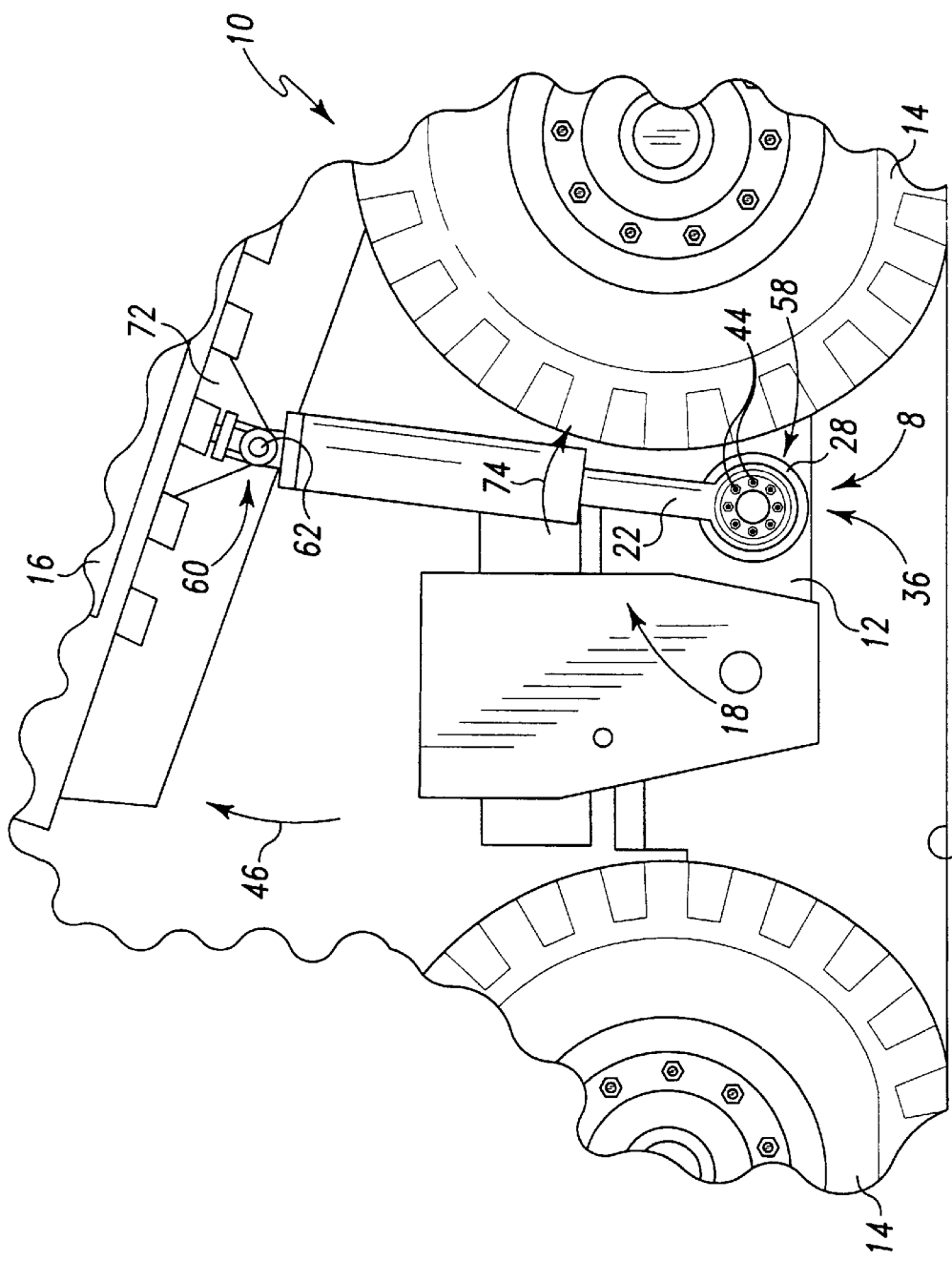
FIG. 2 is a view similar to FIG. 1, but showing the bed in the dumping position.

During use of work machine 10 actuation of hydraulic cylinder 18 causes bed 16 to move relative to frame 12 such that bed 16 is positionable between a loading position and a dumping position. As shown in FIG. 1, when rod 22 is retracted bed 16 is in a substantially parallel relationship with ground 76 thereby locating bed 16 in the loading position. Having bed 16 located in the loading position facilitates material, such as dirt, being loaded into bed 16. However, as shown in FIG. 2, actuation of hydraulic cylinder 18 causes the extension of rod 22 thereby pushing bed 16 in the direction indicated by arrow 46. Pushing bed 16 in the direction indicated by arrow 46 locates bed 16 in the dumping position such that bed 16 is tilted relative to ground 76. Having bed 16 located in the dumping position facilitates the removal of material from bed 16 under the influence of gravity.

It should be appreciated that as rod 22 is extended and bed 16 is moved from the loading position to the dumping position, hydraulic cylinder 18 and outer race 42 rotate around the central axis of rotation $L_2$ (see FIG. 4) relative to frame 12 in a direction indicated by arrow 74. In addition, it should be appreciated that as rod 22 is retracted and bed 16 is moved from the dumping position to the loading position, hydraulic cylinder 18 and outer race 42 rotate around central axis of rotation $L_2$ (see FIG. 4) relative to frame 12 in a direction opposite to the one indicated by arrow 74. However, it should also be understood that as bed 16 is moved from the loading position to the dumping position and vice versa in the above described manner, attachment member 30 and inner race 38 remain stationary relative to frame 12. Therefore, with respect to the attachment mechanism between second end 58 of hydraulic cylinder 18 and frame 12, only inner race 38 and outer race 42 move relative to one another as bed 16 is moved between the loading position and the dumping position. As a result, the wear associated with moving bed 16 between the loading position and the dumping position is substantially confined to bearing assembly 36.

Confining the wear to bearing assembly 36 is an important aspect of the present invention since bearing assembly 36 is easily removed from work machine 10 and replaced with a new bearing assembly 36. Specifically, in order to remove bearing assembly 36 from neck portion 34, adapter 28 is first removed from outer race 42. Alternatively, adapter 28 and outer race 42 are removed together. Inner race 38 is then detached from neck portion 34 by unscrewing each fastener 44 such that fasteners 44 are removed from threaded receptacles 66 and apertures 64. Bearing assembly 36 is then removed from neck portion 34. The new bearing assembly 36 is then secured to neck portion 34 and hydraulic cylinder 18 in the manner previously described. Being able to easily remove and replace bearing assembly 36 reduces the maintenance costs of work machine 10.

This is in contrast to other assemblies designed to couple bed 16 to frame 12. For example, other assembly designs allow components which are in direct contact with the attachment member, such as an inner race, to rotate relative thereto during the movement of bed 16 between the loading position and the dumping position. This relative rotation between the attachment member and an inner race causes wear on the attachment member which eventually results in its failure. Therefore, the wear is not substantially limited to an easily replaceable bearing assembly (i.e. bearing assembly 36) as described above for the present invention. As a result, the attachment member must be removed from the work machine and replaced. It should be appreciated that removing and replacing an attachment member is substantially more expensive and time consuming than removing bearing assembly 36 since the attachment member is typically welded to the frame of the work machine. Therefore, the attachment member must be cut off of the frame and a new one welded thereto. This is in contrast to the present invention which only requires adapter 28 to be removed from outer race 42 and a number of fasteners 44, such as bolts, to be removed from inner race 38 so that the old bearing assembly 36 can be replaced with a new bearing assembly 36.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An assembly for coupling a dump truck bed to a frame of a work machine, comprising:

an attachment member adapted to be secured in fixed relation to said frame, said attachment member having a first fastener aperture defined therein;

a cylinder having a first end and a second end, said first end of said cylinder is adapted to be pivotally coupled to said dump truck bed;

a bearing assembly having an inner race and an outer race, wherein (i) said outer race is disposed around said inner race such that said outer race rotates in relation to said inner race thereby defining a central axis of rotation, (ii) said outer race is fixed in relation to said second end of said cylinder, (iii) said inner race is fixed in relation to said attachment member, and (iv) said inner race has a second fastener aperture defined therein; and a fastener positioned within said first aperture of said attachment member and said second aperture of said inner race so as to secure said inner race to said attachment member, wherein said first aperture of said attachment member and said second aperture of said inner race are each eccentrically located relative to said central axis of rotation.

2. The assembly of claim 1, wherein:

said first aperture of said attachment member and said second aperture of said inner race are linearly aligned so as to define a line L1, said central axis of rotation defines a line L2, and said line L1 and said line L2 are not linearly aligned.

3. The assembly of claim 1, wherein said fastener physically contacts said inner race when said fastener is positioned within said first aperture of said attachment member and said second aperture of said inner race.

4. The assembly of claim 1, wherein:

said cylinder is positionable between a retracted position and an extended position, and movement of said cylinder from said retracted position to said extended position causes said outer race to move in relation to said inner race.

5. The assembly of claim 4, wherein movement of said cylinder from said retracted position to said extended position causes said dump truck bed to raise vertically upwardly.

6. The assembly of claim 1, wherein:

said attachment member includes a neck portion and a face portion, said neck portion is horizontally oriented, said face portion is vertically oriented, and said inner race is disposed around said neck portion of said attachment member.

7. The assembly of claim 6, wherein:

said inner race includes a bearing portion and a fastener portion, said bearing portion is positioned adjacent to said neck portion of said attachment member, and said fastener portion is positioned adjacent to said face portion of said attachment member.

8. The assembly of claim 1, wherein said fastener includes a bolt which is positioned within said first aperture of said attachment member and said second aperture of said inner race.

9. An assembly for coupling a dump truck bed to a frame of a work machine, comprising:

an attachment member adapted to be secured in fixed relation to said frame, said attachment member having a plurality of first fastener apertures defined therein;

a hydraulic cylinder having a first end and a second end, said first end of said hydraulic cylinder is adapted to be pivotally coupled to said dump truck bed;

a bearing assembly having an inner race and an outer race, wherein (i) said outer race is disposed around said inner race such that said outer race rotates in relation to said inner race thereby defining a central axis of rotation, (ii) said outer race is fixed in relation to said second end of said hydraulic cylinder, (iii) said inner race is fixed in relation to said attachment member, and (iv) said inner race has a plurality of second fastener apertures defined therein; and a plurality of bolts respectively positioned within said plurality of first apertures of said attachment member and said plurality of second apertures of said inner race so as to secure said inner race to said attachment member, wherein said plurality of said first apertures of said attachment member and plurality of said second apertures of said inner race are each eccentrically located relative to said central axis of rotation.

10. The assembly of claim 9, wherein:

said first apertures of said attachment member and each of said second apertures of said inner race are linearly aligned so as to define lines L1, said central axis of rotation defines a line L2, and said lines L1 and said line L2 are not linearly aligned.

11. The assembly of claim 9, wherein said bolts physically contact said inner race when said bolts are positioned within said first apertures of said attachment member and said second apertures of said inner race.

12. The assembly of claim 9, wherein:

said cylinder is positionable between a retracted position and an extended position, and movement of said cylinder from said retracted position to said extended position causes said outer race to move in relation to said inner race.

13. The assembly of claim 12, wherein movement of said cylinder from said retracted position to said extended position causes said dump truck bed to raise vertically upwardly.

14. The assembly of claim 9, wherein:

said attachment member includes a neck portion and a face portion, said neck portion is horizontally oriented, said face portion is vertically oriented, and said inner race is disposed around said neck portion of said attachment member.

15. The assembly of claim 14, wherein:

said inner race includes a bearing portion and a fastener portion, said bearing portion is positioned adjacent to said neck portion of said attachment member, and said fastener portion is positioned adjacent to said face portion of said attachment member.

\* \* \* \* \*